Oct. 1, 1935.  A. B. KELLER  2,015,940
APPARATUS FOR REBORING ENGINE BEARINGS
Filed Feb. 20, 1932  2 Sheets-Sheet 2
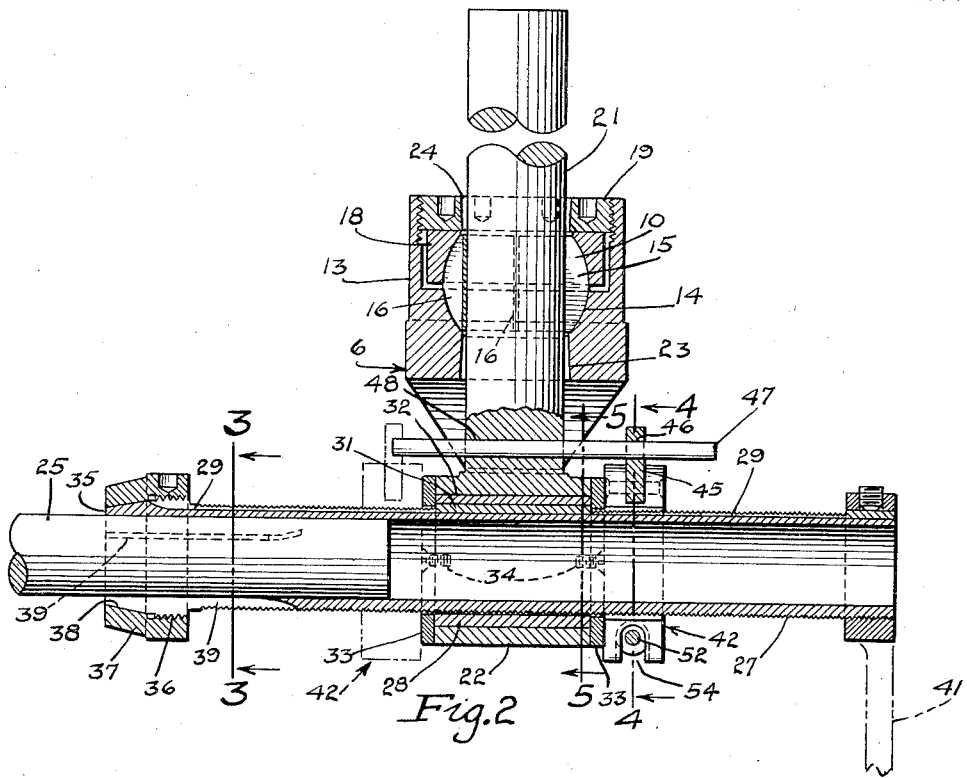
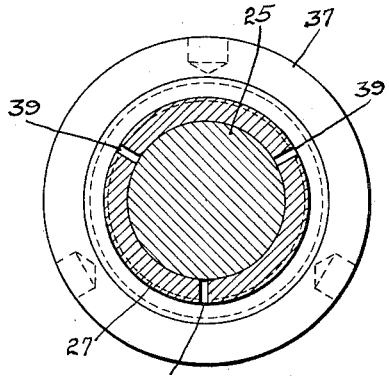
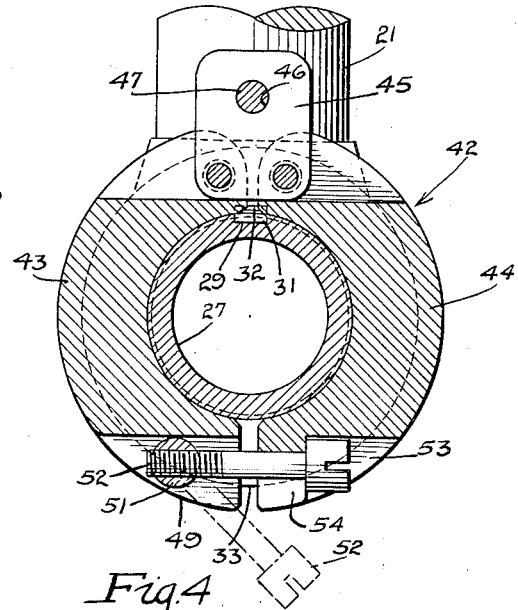
INVENTOR
ALGOT B. KELLER Patented Oct. 1, 1935

2,015,940

UNITED STATES PATENT OFFICE 2,015,940

APPARATUS FOR REBORING ENGINE BEARINGS

Algot B. Keller, Menomonie, Wis.

Application February 20, 1932, Serial No. 594,232

1 Claim. (Cl. 287—12)

This invention relates to an improved apparatus for reboring engine bearings, comprising a boring bar having means whereby said boring bar may be quickly axially alined with the engine bearings.

An object of the invention is to provide a support having a concaved seat therein adapted to receive a split spherical element provided with a bore adapted to receive a cylindrical member such as a hanger, and means being received in threaded engagement with said support adapted to force said element into engagement with said seat, whereby said element will contract and grip said member and secure it in adjusted position in said support.

A further object is to provide an apparatus for reboring engine bearings comprising a bridge member adapted to be secured to the engine frame and having a hanger mounted therein provided at its lower end with a suitable bearing adapted to receive and rotatably support a boring bar, and means being provided in said bridge member permitting universal adjustment of the hanger therein, whereby the boring bar supported thereby may be readily and quickly axially alined with the engine bearings.

A further object is to provide an apparatus for reboring engine bearings comprising a bridge member adapted to be secured to the engine frame in the usual manner, and having a hub provided with a spherical seat, a spherical element mounted in said seat and having a bore adapted to receive a hanger, the lower end of which is provided with a suitable bearing, means by which said spherical element may be actuated to clampingly engage said hanger and to adjustably secure the latter to the hub, a bushing mounted for rotation in the hanger bearing, an exteriorly threaded sleeve mounted in said bushing and having means at one end for securing it to a boring bar, means for driving said sleeve, means permitting longitudinal movement of the sleeve with respect to the bushing, but preventing the sleeve from relatively rotating therein, and means received in threaded engagement with said sleeve adapted to control the longitudinal or feeding movement of the sleeve when the latter is rotated.

A further object resides in the provision of a portable apparatus for reboring engine bearings, comprising means for universally supporting the hangers by which the boring bar is supported, so that the latter may be axially alined with the engine bearings; and, in the provision of a novel means for imparting a feeding movement to the boring bar and whereby the boring bar may be longitudinally fed in either direction.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 2 is an enlarged detail sectional view showing the feeding mechanism;

Figure 3 is an enlarged detail sectional view on the line 3—3 of Figure 2, showing the means provided for securing the boring bar to the feed sleeve;

Figure 4 is a detail sectional view on the line 4—4 of Figure 2, showing the split feed nut;

Figure 6:
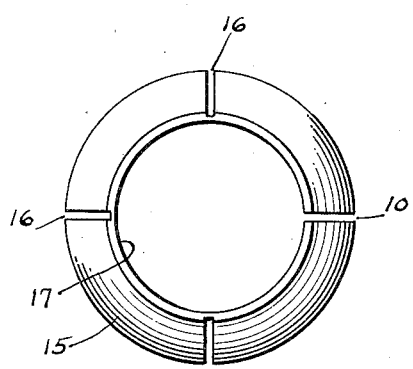
Figure 5:
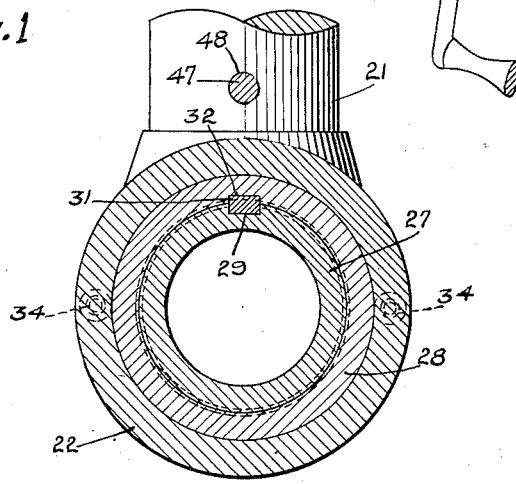

Figure 5 is a detail sectional view on the line 5—5 of Figure 2, showing the means for preventing relative rotation of the feed sleeve within the bushing mounted in the bearing provided at the lower end of the hanger; and Figure 6 is a plan view of the spherical element removed from the bridge member, and showing the slits provided in the periphery thereof for permiting contraction and expansion thereof.

Figure 1:
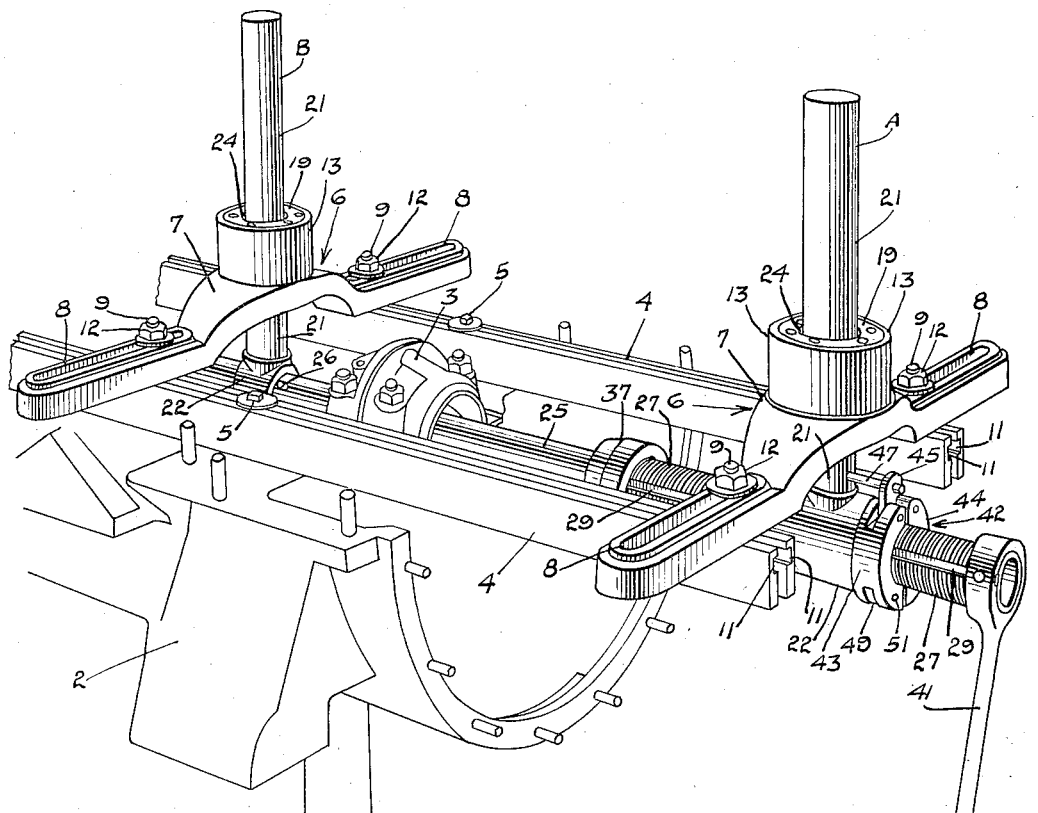
Figure 1 is a perspective view showing a portion of an engine frame with the novel apparatus supported therein.

In the selected embodiment of the invention here shown, there is illustrated in Figure 1, a portion of an engine comprising the frame 2 provided with the usual crank shaft bearings 3, one of which is shown. Parallel bars 4, of ordinary well-known construction, are shown secured to the upper face of the engine frame by suitable bolts 5. Upon these parallel bars, the boring apparatus is mounted, as will subsequently be described.

The novel boring apparatus herein disclosed comprises a plurality of bridge members 6, all of which are substantially alike in construction, and it will therefore be necessary to describe but one in detail. Each bridge member comprises a central arched portion 7 provided with oppositely extending slotted arms 8 adapted to receive bolts 9 having their heads received in grooves 11 provided in the parallel bars 4, as is well-known. Nuts 12 are engaged with the bolts 9 and secure the arms to the parallel bars.

Each bridge member further has a hub 13 provided with a spherical seat 14 adapted to receive a split spherical clamping element 15, as shown in Figure 2. A plurality of saw slits 16 are provided in the periphery, the spherical element 15, as shown in Figure 6, one of which is cut clear through the wall of the element 15, as shown at 10, whereby it may readily be contracted to reduce the diameter of the bore 17 thereof. A clamping member or collar 18 is seated upon the upper end of the spherical element 15, and is adapted to be forced into engagement with the periphery of the element by means of a nut 19, received in threaded engagement with the upper end of the hub 13, as best shown in Figure 2.

A suitable hanger 21, preferably cylindrical in cross section, is supported in the bore 17 of the element 15, and has a suitable bearing 22 at its lower end. The spherical element 15, clamping member 18, and nut 19 provide means whereby the hanger 21 may be fixedly secured in the hub 13 of the bridge member 6 and, whereby it may be universally adjusted therein to accurately aline the bearing 22 with the engine bearings. To permit such universal movement of the hanger 21 in the hub 13, the bore 23 provided in the lower portion of the hub is made relatively larger than the diameter of the hanger 21, and may be slightly outwardly tapered in a downward direction, as shown in Figure 2, and a similar bore 24 is provided in the nut 19, so as to provide free swinging movement of the hanger within the hub within certain limits.

The above described mechanism provides in effect a ball-and-socket joint permitting universal adjustment of the hanger in the bridge member, whereby the bearing 22 may be quickly and accurately alined with the alined axes of the engine bearings.

Means is provided for imparting a feeding movement to the boring bar 25, adapted to be supported in the bearings 22 of the hanger 21. The boring bar, when in use, passes through the alined engine bearings 3, and is provided with a selected cutting tool 26 adapted to rebore the engine bearings 3, or to reface the ends of the bearings.

To thus impart a feeding movement to the boring bar 25, a threaded sleeve 27 is rotatably mounted in the bearing 22 of the hanger 21, shown at the right hand side of Figure 1. The sleeve 27 is exteriorly threaded, as shown in Figure 2, and to minimize wear on these threads when the sleeve is rotated, the latter is mounted in a bushing 28 rotatably mounted in the hanger bearing 22. To prevent the sleeve from relatively rotating in the bushing 28, the sleeve has a longitudinally extending key-way 29 adapted to receive a feather key 31, which also is received in a key-way 32 provided in the bore of the bushing 28. End plates 33 are secured to the end faces of the bearing 22 by such means as screws 34, and prevent longitudinal movement of the bushing 28 and feather key 31. By thus supporting the sleeve 27 in the bearing 22, it will be noted that the sleeve does not relatively rotate in the bushing 28 but is permitted to move only in a longitudinal direction therein. The bushing 28 rotates with the sleeve 27, when the latter is rotated, and thus rotatably supports the sleeve in the bearing 22.

One end of the sleeve 27 is shown provided with a tapered head 35 having a threaded portion 36 adapted to receive a suitable nut 37 provided with a tapered bore 38 adapted to engage the tapered periphery of the head 35. A plurality of slots 39 are provided in the head 35 to permit contraction of the latter, when the nut 37 is tightened, and whereby the head 35 may clampingly grip the end of the boring bar 25, as will be readily understood by reference to Figures 2 and 3. The head 35 and nut 37 therefore function as a chuck for detachably securing the boring bar to the feed sleeve 27. The opposite end of the sleeve is provided with an operating crank 41, by which the sleeve may be conveniently rotated.

To cause longitudinal movement of the sleeve when it is rotated, a suitable split feed nut 42 is received in threaded engagement with the sleeve 27 and is adapted to engage one or the other of the end plates 33 of the bearing 22, depending upon the direction in which the boring bar is to be fed. The feed nut 42 is shown comprising two sections 43 and 44, each pivotally connected to a plate 45 having an aperture 46 therein adapted to receive a lock pin 47, which also is adapted to be received in an aperture 48 provided in the hanger 21, as shown in Figure 2. The section 43 of the feed nut is provided at its lower portion with a fork 49, the spaced walls of which are apertured to receive a stud 51 having a threaded socket adapted to receive a clamping screw 52, as shown in Figure 4. The head of the clamping screw is adapted to be seated in a recess 53 provided in the section 44 of the nut, and the body of the screw 52 is received in an open slot 54, whereby the screw when released, may be swung outward to the dotted line position shown in Figure 4, to permit the two halves of the nut to be swung apart, whereby the nut may be quickly detached from the sleeve and moved from the full to the dotted line position shown in Figure 2. By thus changing the collar from one side of the bearing 22 to the other, and reversing the rotation of the sleeve 27 the longitudinal travel of the boring bar in either direction may be controlled.

In use, the apparatus is secured to the engine block as shown in Figure 1, and the bearings 22 are axially alined with the crank shaft bearings. The boring bar is then attached to the sleeve 27 by means of the head 35 and nut 37. After properly positioning the cutting tool 26 with respect to the bearing to be refinished, the feed nut 42 is secured in operative position, as shown in Figure 2, whereupon the sleeve may be rotated by means of the crank 41, thereby causing the sleeve to impart a feeding movement to the boring bar 25. For example, when the cutting tool 26 is positioned at the left hand side of the engine bearing 3, as shown in Figure 1, and the feed nut 42 is positioned as shown in full lines in Figure 2, and assuming that the sleeve 27 has a right hand thread; then when the sleeve is rotated in a counter-clockwise direction, when viewed from the crank end, as shown in Figure 1, the boring bar will move in a direction towards the right, when viewed as shown in Figure 1, thereby causing the cutting tool to feed through the engine bearing 3 in a direction from left to right. When the boring bar is to be translated in the opposite direction, the split feed collar is moved from the full to the dotted line position shown in Figure 2, and the sleeve is rotated in a clockwise direction, whereby the sleeve will move in a direction from right to left, when viewed as shown in Figures 1 and 2.

When the ends of a bearing are to be refaced, the lock pin 47 is disengaged entirely from the feed nut 42 whereby the latter is permitted to rotate freely with the sleeve 27, and during such rotation of the feed nut it will not impart axial movement to the boring bar. To bring the cutting tool into engagement with an end face of the bearing to be refaced, the operator may grasp the feed nut with one hand and temporarily interrupt its rotation, whereupon the cutting tool will be forced against the face of the bearing by axial movement of the boring bar. When the tool has cut into the end face of the bearing to a predetermined depth, the fuel nut is released, whereby it will again rotate freely with the sleeve and thus interrupt axial feeding travel of the boring bar, thereby causing the tool to cut to a finish, as the boring bar is rotated. Both ends of a bearing may be refaced by simply changing the position of the lock nut 42 upon the sleeve 27 and reversing the rotation of the sleeve, as previously described with reference to the boring operation.

From the foregoing, it will be seen that by the employment of this novel apparatus, the boring bar may be quickly axially alined with the engine bearings so that the latter may be accurately machined and refinished. The novel feeding mechanism provided for operating the boring bar also provides a very simple and efficient mechanism whereby the feeding operation of the bar may be readily controlled and whereby the direction of movement of the feed bar may be quickly changed by simply moving the split feed collar 42 from one position to another, and changing the direction of rotation of the feed sleeve 27.

In the specification, I have described the hangers A and B to be substantially alike in construction, but it is to be understood that the bearing 22 of hanger A is bored to receive the bushing 28 and is therefore provided with the end plates 33, whereas the corresponding bearing of hanger B may be provided with a bore adapted to fit the boring bar 25, it being unnecessary to provide a bushing in this bearing and the end plates 33 shown and described in Figure 2.

I claim as my invention:

In a device for boring engine bearings, a universal mounting for the boring tool shaft comprising a bearing in which said shaft is rotatably mounted, a hanger supporting said bearing, a support for said hanger having a semi-spherical seat therein, a contractible spherical element supported on said seat and having a bore through which said hanger projects, a clamping member having a semi-spherical seat adapted to engage said spherical element, and a ring nut encircling said hanger and having threaded engagement with said hanger support, said ring nut being adapted to engage said clamping member to contract said spherical element and clamp said hanger in adjusted position.

ALGOT B. KELLER.